July 29, 1941.  A. P. TABER  2,251,080

SEWER CARTRIDGE

Filed Feb. 15, 1940

WITNESSES

INVENTOR
Arthur P. Taber
BY
ATTORNEYS

Patented July 29, 1941

2,251,080

UNITED STATES PATENT OFFICE 2,251,080

SEWER CARTRIDGE

Arthur Pratt Taber, Minneapolis, Minn.

Application February 15, 1940, Serial No. 319,179

7 Claims. (Cl. 206—0.5)

This invention relates to an improved sewer cartridge and has for an object to provide a construction designed to remove roots of trees or other obstacles in sewers without the necessity of taking up the sewer.

Another object of the invention is to provide an improved cartridge with a chemical therein of a kind to dissolve or destroy fibrous matter in the sewer when brought into contact therewith.

An additional object is to provide a sewer cartridge having a body of a more or less foraminous material, a filling of caustic soda or other chemical adapted to destroy fibrous material, and means acting as hooks for causing the cartridge to engage or interlock with obstacles in the sewer so as to hold the chemical near the matter to be destroyed.

In the accompanying drawing—

Figure 1:
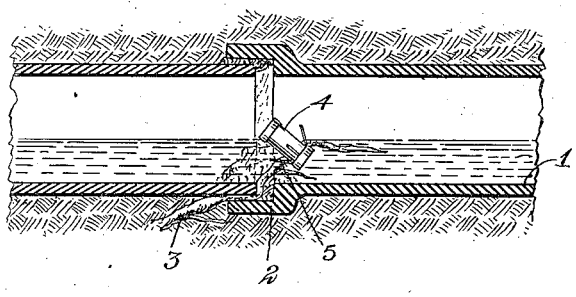
Fig. 1 is a fragmentary longitudinal sectional view through part of a sewer system illustrating how the roots of trees may enter the sewer, the cartridge embodying the invention being shown in operative position.

Referring to the accompanying drawing by numerals, 1 indicates a sewer of any conventional or desired kind. As is true of all sewers, there is a joint 2 between certain of the pipes. As illustrated in Fig. 1, the root 3 of a tree has extended through the joint and formed a certain obstruction in the sewer. The cartridge 4, as shown in Fig. 1, is interlocked with part of the root and is held by hooks 5 so that the chemicals 6 in the cartridge 4 will act on the root to destroy the same.

Figure 2:
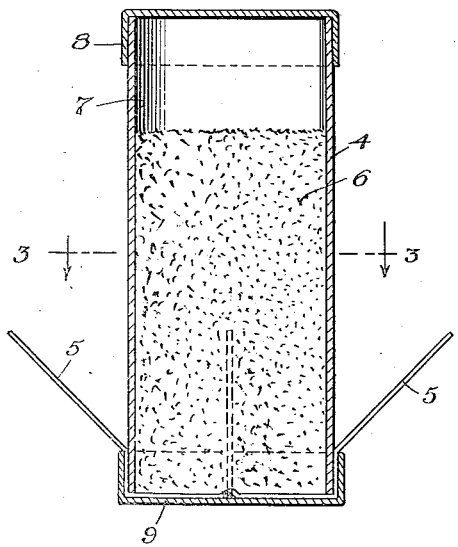
Fig. 2 is an enlarged vertical sectional view through a cartridge disclosing an embodiment of the invention.
Figure 3:
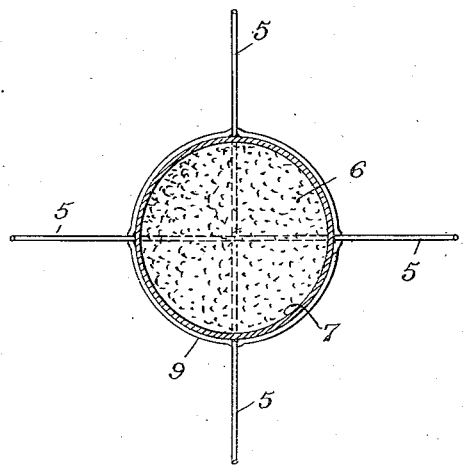
Fig. 3 is a transverse sectional view through Fig. 2 on the line line 3—3.

The cartridge may be made of any desired shape but preferably is formed with a tubular body 7 having caps 8 and 9 at the ends. These caps may be held in place by any suitable adhesive, as for instance glue. The body 7 is made preferably of paper, though it could be made of other material provided the material is porous to a certain extent. Arranged in the body 7 is a chemical 6, which may be any suitable chemical or a mixture of chemicals, which when supplied with moisture will dissolve or destroy the fibrous matter in the sewer. While various chemicals may be used to secure this result, it has been found that caustic soda (NaOH) produces excellent results. Where caustic soda is used a quantity of flaked caustic is compressed in the lower part of the body 7, as shown in Fig. 2, so that the upper part will be filled with air and, consequently, when the cartridge is inserted into the sewer it will float in an almost upright position so that the metal protuberances or hooks 5 may have a chance to interlock with the roots or other obstructions in the sewer. The water in the sewer reacts with the caustic soda and momentarily produces a very high temperature which not only will destroy the root in the sewer but some of it will seep through the joint 2 and discourage the growth of the root at this point.

For ordinary use in a home the body 7 of the cartridge may be three-quarters of an inch or an inch in diameter and from two to three inches long, though it will be understood that the cartridge could be made very small, as for instance, one-quarter of an inch in diameter and one inch long, or may be made very large for special circumstances, as for instance, several feet in length.

Instead of using a chemical which will react with water to secure the desired action, it would be possible to use other chemicals, or combinations of chemicals that will react with each other so as to produce momentarily a high temperature for destroying roots and other foreign matter in sewers. Preferably one of the alkali metals is used, as for instance, sodium hydroxide (NaOH) or potassium hydroxide (KOH).

Where the small sewer pipe leading to an ordinary dwelling is bothered with roots therein, the use of a cartridge as just described one each three months will keep the sewer free and will do so without injuring the pipe. The cartridge may be inserted in the sewer at any suitable opening, or if desired, may be placed in a toilet bowl and the toilet flushed. This will drive the cartridge down and along the sewer pipe until it strikes the obstruction where the hooks 5 will engage the obstruction and permit the caustic soda or other chemical to perform the function of dissolving or destroying the obstruction.

While any desired material may be used for the body 7, preferably a more or less porous paper is used as it will dissolve in the water especially when assisted by the caustic soda, so that there will be no objectionable matter left in the sewer. The only metal part of the structure is the hooks 5. These hooks may be made from a suitable size wire, as for instance, a sixteen-gage wire. As shown in the accompanying drawing, two pieces of wire have been used and bent to the desired shape to fit within cap 9 and extend at an angle thereto. More or even less of these hooks may be used without departing from the spirit of the invention.

It will be understood, of course, that the paper or body 7 should be strong enough to last until it reaches the obstruction and also porous enough to readily allow water to pass therethrough. The heat of the reaction of the caustic soda and the water will produce the desired result of destroying the obstruction.

It will also be understood that the caustic soda will begin to function as soon as water is applied thereto but by compressing the caustic soda in a paper or other container the reaction is comparatively slow until it reaches the obstruction so that there is ample caustic soda left to secure the desired result. If one cartridge is not sufficient, two or more may be used.

While the cartridge is designed particularly for removing fibrous material from sewers, it will be evident that it may be used for industrial applications. When used for other purposes than small sewers, preferably the cartridge is made larger or of a size to perform the desired function at the selected place.

I claim:

1. In a device of the character described, a non-moisture proof container, a supply of chemicals therein capable of dissolving an obstruction in a pipe when brought into engagement therewith, and an interlocking device carried by the container adapted to interlock with the obstruction for holding the container near the obstruction until the supply of chemicals functions.

2. In a device for removing an obstruction of fibrous matter in a sewer pipe, a substantially porous container, a supply of chemicals in said container capable of dissolving fibrous matter in the presence of water, and a plurality of hooks carried by the container positioned to interlock with the obstruction for holding the container in functioning position near said obstruction.

3. In a device for removing obstructions of fibrous matter in sewer pipes, a container, a supply of caustic soda, and a plurality of hooks carried by said container at one end for engaging said obstruction and holding the container and caustic soda near the obstruction.

4. A cartridge of the character described comprising a porous container, a supply of compressed caustic soda in the container at one end thereof, and hooks at the end of the container carrying the caustic soda extending from the container for interlocking with an obstruction in a sewer pipe when the cartridge is passing through the pipe.

5. A cartridge for removing roots from sewer pipes comprising a porous paper container, a supply of compressed flaked caustic soda in said container, and hook members extending from the end of the container for engaging roots in the sewer pipes for holding the caustic soda near the roots until the caustic soda with the water in the sewer has functioned to dissolve the roots.

6. A cartridge for removing roots from a sewer pipe including a foraminous container, a plurality of metal members extending from the container acting as hooks positioned to interlock with said roots when the cartridge attempts to move along the pipe, and a supply of compressed chemicals in one end of the container with the other end containing air whereby the end carrying the chemicals will remain submerged when moving along a sewer pipe.

7. A cartridge for removing an obstruction of fibrous matter in a sewer pipe including a porous paper containing a supply of compressed caustic soda partly filling the container, and a plurality of metal wire members extending outwardly from one end of the container for interlocking with said obstruction for holding the cartridge near the obstruction until said caustic soda has functioned.

ARTHUR PRATT TABER.